United States Patent

Sano et al.

[11] Patent Number: 5,929,171
[45] Date of Patent: Jul. 27, 1999

[54] SOLID GOLF BALL

[75] Inventors: Yoshinori Sano, Shirakawa; Satoshi Iwami, Hyogo-ken, both of Japan

[73] Assignee: Sumitomo Rubber Industries, Ltd., Hyogo-Ken, Japan

[21] Appl. No.: 08/985,546

[22] Filed: Dec. 5, 1997

[30] Foreign Application Priority Data

Dec. 5, 1996 [JP] Japan .................................. 8-325120
Dec. 20, 1996 [JP] Japan .................................. 8-341091
Mar. 5, 1997 [JP] Japan .................................. 9-050144
Mar. 11, 1997 [JP] Japan .................................. 9-056110

[51] Int. Cl.$^6$ .................................................. A63B 37/06
[52] U.S. Cl. .......................... 525/261; 525/274; 525/291; 473/372; 473/373; 473/374; 473/377
[58] Field of Search .................................... 525/261, 274, 525/291; 473/372, 373, 374, 377

[56] References Cited

U.S. PATENT DOCUMENTS 3,336,256  8/1967  Rosen .
3,786,074  1/1974  Genta .
4,556,220  12/1985  Tominaga .
5,247,041  9/1993  Iguchi .
5,252,652  10/1993  Egashira .
5,328,980  7/1994  Decker .

FOREIGN PATENT DOCUMENTS 4-109970  4/1992  Japan .

Primary Examiner—David Buttner

[57] ABSTRACT

The present invention provides a solid golf ball wherein rebound characteristics and shot feel at the time of hitting are improved without adversely affecting satisfactory flight distance and durability as a feature of the solid golf ball.

Disclosed is a solid golf ball comprising a core and a cover formed on the core, the core being composed of a rubber composition containing (i) a base rubber, (ii) a metal salt of α,β-unsaturated carboxylic acid, (iii) a co-crosslinking initiator, and (iv) a specific organosulfur compound.

4 Claims, No Drawings

SOLID GOLF BALL

FIELD OF THE INVENTION

The present invention relates to a solid golf ball having improved rebound characteristics and improved shot feel at the time of hitting without adversely affecting satisfactory flight distance and durability inherent to solid golf balls.

BACKGROUND OF THE INVENTION

Solid golf balls are classified into a two-piece golf ball, which is obtained by directly covering a core with a cover material, and a multi-layer golf ball, which is obtained by interposing one or more intermediate layers between a core and a cover. In the solid golf ball, an elastic portion including the core are formed from an elastic material obtained by vulcanization molding a rubber composition. The rubber composition for forming the elastic portion is generally composed of a base rubber (e.g. polybutadiene rubber, etc.), a monomer having an unsaturated bond (e.g. metal salt of α,β-unsaturated carboxylic acid, etc.) as a co-crosslinking agent for improving a rebound coefficient and impact resistance of the golf ball and a peroxide as a co-crosslinking initiator. It is also known that the core imparts suitable hardness and durability and a solid golf ball using the core exhibits excellent durability and good flight performance, because a three-dimensionally crosslinked polymer is formed by the above mentioned rubber composition.

The solid golf ball attains long flight distance because of large ball velocity at the time of hitting, and shows good flight performance and good durability. However, the solid golf ball has problems in shot feel and controllability at approach shot, because shot feel at the time of hitting is hard and spin is not easily applied on the golf ball and the controllability of the ball at approach shot is poor, because a ball velocity at the time of hitting is large and an area in contact with a golf club is small.

In order to improve shot feel at the time of hitting, it is proposed that the golf ball is made softened by reducing the hardness of the core. In the solid golf ball, the softening of the core improves the shot feel at the time of hitting of the golf ball, but the rebound characteristics or initial velocity of the golf ball at the time of hitting are lowered, and sufficient flight distance is not obtained.

In addition, for improving spin performance, the cover material must be improved. This is because that the ionomer resin, which is generally used as a cover material of the solid golf ball, has high rigidity and hardness to satisfy the flight performance and durability of the golf ball, but spin performance is not satisfied.

In order to solve the problems, a resin having low rigidity and low hardness has been suggested as a cover resin for the solid golf ball. When the rigidity and hardness of the cover are lowered, the spin performance is effectively improved, but the rebound performance of the cover itself is deteriorated, instead. Therefore, satisfactory flight distance as the golf ball is not obtained.

Japanese Patent Kokai Publication No. 109970/1992 suggests that an organosulfur compound is added into the above rubber composition for core. However, the addition of the organosulfur compound makes the core softened and increases the compression value of the core. In order to adjust the compression value within the range necessary for the solid golf balls, an amount of the polymerization initiator or an amount of zinc acrylate as the co-crosslinking agent has to be increased, but this has a drawback increasing the producing cost.

OBJECT OF THE INVENTION

An object of the present invention is to solve the above problems of a conventional solid golf ball and to provide a solid golf ball having good rebound performance and good shot feel at the time of hitting without adversely affecting the flight performance and durability.

The present inventors have intensively studied so as to accomplish the above object. As a result, the present inventors have found that, by using a rubber composition containing a specific amount of a specific organosulfur compound in the core, a golf ball having good rebound performance and good shot feel at the time of hitting can be obtained without adversely affecting the flight performance and durability. Thus, the present invention has been accomplished.

SUMMARY OF THE INVENTION

That is, the present invention provides a solid golf ball comprising a core and a cover formed on the core, wherein the core is formed from a rubber composition comprising:

(i) a base rubber,
(ii) a metal salt of α,β-unsaturated carboxylic acid,
(iii) a co-crosslinking initiator, and
(iv) an organosulfur compound selected from the group consisting of:
  (a) 4-methylphenol sulfide represented by

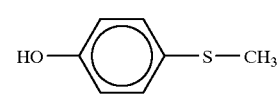

(a)

(b) bis(4-methacryloylthiophenyl)sulfide represented by

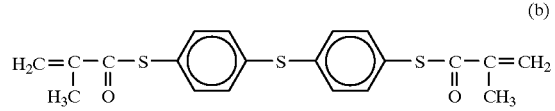

(b)

(c) 4,4'-dithiodibenzene thiol represented by

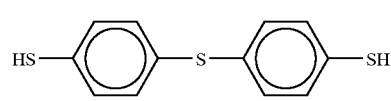

(c)

(d) 4,4'-dibromodiphenylsulfide represented by

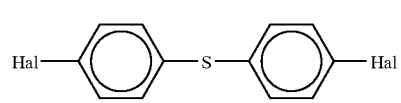

(d)

(wherein Hal represents a halogen atom)

(e) 2-mercaptothiazoline represented by

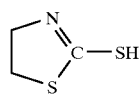
(e)

(f) a mixture thereof.

The core or cover of the present invention can be multi-layered, but at least one layer of the core is formed from the above mentioned specific rubber composition for core.

DETAILED DESCRIPTION OF THE INVENTION

The present invention will be described in detail hereinafter. The core used in the solid golf ball of the present invention is formed from a rubber composition which comprises a base rubber, a metal salt of α,β-unsaturated carboxylic acid, a co-crosslinking initiator, an organosulfur compound and, if necessary, a filler and an additive. The rubber composition is obtained by kneading the above ingredients, using a suitable kneader such as roller, etc. The rubber composition is then molded in a predetermined mold at a temperature of 140 to 170° C. under a pressure of 90 to 120 kgf/cm$^2$ for 10 to 40 minutes to form a core.

The term "base rubber" used herein means a general term expressing all rubber components contained in the rubber composition. The base rubber includes a natural rubber, a synthetic rubber, or a mixture thereof. Examples of the synthetic rubbers are polybutadiene rubber, polyisoprene rubber, styrene-polybutadiene rubber, ethylene-propylenediene rubber (EPDM) and the like. High-cis polybutadiene rubber having a cis-1,4 content of at least 40%, preferably 80% or more is particularly preferable.

Examples of the metal salt of α,β-unsaturated carboxylic acid, which serves as a co-crosslinking agent, are monovalent or divalent metal salts (e.g. zinc salt, magnesium salt, etc.) of α,β-unsaturated carboxylic acid having 3 to 8 carbon atoms (e.g. acrylic acid, methacrylic acid, maleic acid, fumaric acid, etc.). Among them, zinc acrylate is preferable because it imparts high rebound characteristics. An amount of the metal salt of α,β-unsaturated carboxylic acid may be from 15 to 45 parts by weight, preferably from 20 to 35 parts by weight, based on 100 parts by weight of the base rubber. When the amount is larger than 45 parts by weight, the core is too hard and, therefore, shot feel at the time of hitting is poor. On the other hand, when the amount is smaller than 15 parts by weight, the amount of the co-crosslinking initiator must be increased for keeping suitable hardness. Therefore, rebound characteristics are poor and flight distance is lowered.

Examples of the co-crosslinking initiators are organic peroxides such as dicumyl peroxide, 1,1-bis(t-butylperoxy)-3,5-trimethylcyclohexane, 2,5-dimethyl-2,5-di(t-butylperoxy)hexane, t-butyl peroxide, etc. Among them, dicumyl peroxide is preferable. An amount of the initiator may be from 0.2 to 5 parts by weight, preferably from 0.5 to 4.0 parts by weight, based on 100 parts by weight of the base rubber. When the amount is smaller than 0.2 parts by weight, the core is too soft and, therefore, rebound characteristics are poor and flight distance is lowered. On the other hand, when it exceeds 4.0 parts by weight, the amount of the metal salt of α,β-unsaturated carboxylic acid must be reduced for keeping suitable hardness and, therefore, rebound characteristic are poor and flight distance is lowered.

In the rubber composition used in the production of the solid golf ball of the present invention, the organosulfur compound is blended in addition to the above components. Examples of the organosulfur compound used in the present invention include an organosulfur compound selected from the group consisting of:

(a) 4-methylphenol sulfide represented by

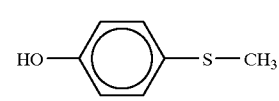
(a)

(b) bis(4-methacryloylthiophenyl)sulfide represented by

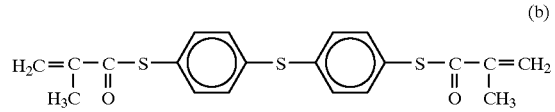
(b)

(c) 4,4'-dithiodibenzene thiol represented by

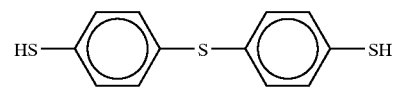
(c)

d) 4,4'-dibromodiphenylsulfide represented by

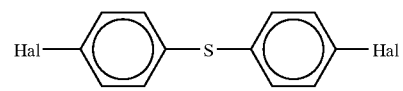
(d)

(wherein Hal represents a halogen atom)
(e) 2-mercaptothiazoline represented by

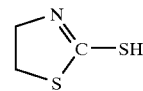
(e)

(f) a mixture thereof.

The organosulfur compound is known to the art and is easily commercially available. An amount of the organosulfur compound may be from 0.05 to 5.0 parts by weight, preferably from 0.1 to 3.0 parts by weight, based on 100 parts by weight of the base rubber. When the amount is smaller than 0.05 parts by weight, the amount is too small and, therefore, the technical effects of the organosulfur compound are not be shown. Even if the amount exceeds 5.0 parts by weight, the technical effects are not improved so much in proportion to the addition amount. In the formula (d), Hal shows a halogen atom (e.g. F, Cl, Br, I, etc.) and Br and Cl are preferable.

The core composition of the golf ball of the present invention may further contain an additive (such as, antioxidant or peptizer), a filler (such as, zinc oxide, barium sulfate, titanium oxide, calcium carbonate or silica) or another component which can be generally used in the production of the core of the solid golf ball.

An outer diameter of the core may preferably be from 32.7 to 42.0 mm, preferably from 33.5 to 40.0 mm. When the outer diameter is smaller than 32.7 mm, rebound performance is deteriorated and, therefore, flight distance is lowered. On the other hand, when the outer diameter is larger than 42.0 mm, an outer diameter of the golf ball is larger and, air resistance during the flight is large and flight distance is lowered. In case of the present invention, the deformation (compression) formed by applying a load within the range from 10 kg (initial load) to 130 kg (final load) to the solid core may preferably be from 2.0 to 7.0 mm, preferably from 2.5 to 6.0 mm. When the deformation is smaller than 2.0 mm, the core is too hard and, therefore, shot feel at the time of hitting is poor. On the other hand, when the deformation is larger than 7.0 mm, the core is too soft and, therefore, durability is poor.

In the present invention, the core is covered with a cover but the cover may have a single-layer structure or a multilayer structure of two or more layers. The cover material may preferably contain a thermoplastic resin, particularly ionomer resin, polyester, nylon or a mixture thereof. The ionomer resin is prepared by neutralizing a portion of carboxylic acids in a copolymer of $\alpha$-olefin and $\alpha,\beta$-unsaturated carboxylic acid having 3 to 8 carbon atoms with metal ion. The $\alpha$-olefin in the thermoplastic resin can be ethylene and propylene. The $\alpha,\beta$-unsaturated carboxylic acid may be acrylate and methacrylate. Examples of the metal ion used for neutralizing are alkali metal ion such as Na ion, K ion, Li ion, etc.; divalent metal ion such as Zn ion, Ca ion, Mg ion, etc.; trivalent metal ion such as Al ion, etc.; and a mixture thereof. Among them, Na ion, Zn ion, Li ion, etc, are often used in view of rebound characteristics, durability, etc. Specific examples of the ionomer resin are Surlyn AD8541 and AD8542 (manufactured by Du Pont Co.); Hi-milan 1557, 1605, 1652, 1705, 1706, 1707, 1855 and 1856 (manufactured by Mitsui Du Pont Polychemical Co.); and IOTEC 7010 and 8000 (manufactured by Exxon Co), but are not limited thereto.

In the present invention, the cover composition may optionally contains other additives such as fillers (e.g. barium sulfate, etc.), colorants (e.g. titanium dioxide, etc.), dispersants, antioxidants, ultraviolet absorbers, photostabilizers, and fluorescent agents or fluorescent whiteners, in addition to the above resins as a main component, so far as the desire characteristics obtained by the golf ball cover are not adversely affected. An amount of the colorant is preferably from 0.1 to 5.0 parts by weight based on 100 parts by weight of the cover resin.

The cover layer in the present invention can be produced by using a well known method used in the formation of the cover of the golf ball, and is not specifically limited. There may be used a method of previously molding the cover composition into a semi-spherical half-shell, coating a core with two semi-spherical half-shells, followed by pressure molding at 130 to 170° C. for 1 to 15 minutes, or a method of directly injecting the cover composition onto a core to coat the core. A thickness of the cover may be from 0.5 to 5.0 mm, preferably from 1.0 to 4.0 mm. When the thickness is smaller than 0.5 mm, the hardness of the golf ball is smaller and, therefore, the rebound coefficient is smaller. On the other hand, when the thickness is large than 5.0 mm, the hardness of the golf ball is larger and, therefore, controllability and shot feel at the time of hitting are poor. A resin having a flexural modulus of 500 to 4000 kgf/cm$^2$ is preferably used as the cover in the present invention. When the flexural modulus is smaller than 500 kgf/cm$^2$, the cover is too soft and, therefore, flight distance is lowered. On the other hand, when the flexural modulus exceeds 4000 kgf/cm$^2$, the cover is too hard and, therefore, shot feel at the time of hitting is poor. The cover may have a Shore D-scale hardness of 40 to 80, preferably 55 to 70. When the shore D-scale hardness is smaller than 40, rebound coefficient is smaller. On the other hand, when the shore D-scale hardness is larger than 80, controllability and shot feel at the time of hitting are poor.

At the time of the cover molding, a lot of recesses referred to as dimples are optionally formed on the surface. The golf ball of the present invention is put on the market after paint finishing and marking stamp are provided to enhance the appearance and commercial value.

In the present invention, the hardness can be reduced by controlling the deformation (compression) formed by applying a load within the range from 10 kg (initial load) to 130 kg (final load) to the core of the above formulation composition within a specific range, thereby improving shot feel at the time of hitting. On the other hand, since a decrease in rebound coefficient caused by the reduction in hardness is inhibited by blending a specific organosulfur compound, good rebound characteristics and flight performance are maintained regardless of low hardness.

According to the present invention, the rebound performance and shot feel at the time of hitting could be improved without adversely affecting the flight performance and durability, by using a specific organosulfur compound in a rubber composition prepared by blending a metal salt of $\alpha,\beta$-unsaturated carboxylic acid as a co-crosslinking agent with a base rubber such as polybutadiene, etc.

EXAMPLES

The present invention will be illustrated by the following Examples which do not limit the present invention.

Examples 1 to 17 and Comparative Examples 1 to 8 Production of Core

A spherical core having a diameter of 39.0 mm was obtained by kneading a rubber composition for core of the formulation shown in the following Tables 1 to 4, followed by vulcanization molding in a mold under the vulcanization conditions shown in Tables 1 to 4. Although the core of Example 15 was the same as that of Example 16, a cover to be covered on the core was different and therefore explained as different working example. The core compression and rebound coefficient of the resulting core were measured. The results are shown in Tables 6 to 10. The evaluation methods are explained after Table 5.

TABLE 1

| | Core formulation (Parts by weight) | | | | | |
|---|---|---|---|---|---|---|
| Example No. | 1 | 2 | 3 | 4 | 5 | 6 |
| BR11 (Note 1) | 100 | 100 | 100 | 100 | 100 | 100 |
| Zinc acrylate | 34 | 25 | 34 | 30 | 26 | 34 |
| Zinc oxide | 16 | 23 | 16 | 19 | 22 | 16 |
| Antioxidant (Note 2) | 0.5 | 0.5 | 0.5 | 0.5 | 0.5 | 0.5 |
| Dicumyl peroxide | 1.0 | 2.4 | 1.1 | 1.6 | 2.1 | 1.8 |

TABLE 1-continued

| | Core formulation (Parts by weight) | | | | | |
|---|---|---|---|---|---|---|
| Example No. | 1 | 2 | 3 | 4 | 5 | 6 |
| 4-Methylphenol sulfide | 0.15 | 0.13 | — | — | — | — |
| Bis(4-methacryloyl-thiophenyl) sulfide | — | — | 0.5 | 0.5 | 0.5 | 1.5 |
| Vulcanization conditions (° C. × min.) | 140 × 20 + 165 × 8 | 160 × 35 | 150 × 20 | 150 × 20 | 150 × 20 | 150 × 20 |

TABLE 2

| | Core formulation (Parts by weight) | | | | | | | |
|---|---|---|---|---|---|---|---|---|
| Example No. | 7 | 8 | 9 | 10 | 11 | 12 | 13 | 14 |
| BR11 (Note 1) | 100 | 100 | 100 | 100 | 100 | 100 | 100 | |
| Zinc acrylate | 30 | 26 | 34 | 34 | 30 | 26 | 34 | |
| Zinc oxide | 19 | 22 | 16 | 16 | 19 | 22 | 16 | |
| Antioxidant (Note 2) | 0.5 | 0.5 | 0.5 | 0.5 | 0.5 | 0.5 | 0.5 | |
| Dicumyl peroxide | 1.6 | 2.1 | 1.8 | 1.1 | 1.6 | 2.1 | 1.8 | |
| 4,4'-Thiodibenzenethiol | 0.5 | 0.5 | 1.5 | — | — | — | — | |
| 4,4'-Dibromo-diphenyl sulfide | — | — | — | — | 0.5 | 0.5 | 0.5 | 1.5 |
| Vulcanization conditions | (150°C. ×20min.) | | | | | | | |

TABLE 3

| | Core formulation (parts by weight) | | |
|---|---|---|---|
| Example No. | 15 | 16 | 17 |
| BR11 (Note 1) | 100 | 100 | 100 |
| Zinc acrylate | 34 | 34 | 25 |
| Zinc oxide | 16 | 16 | 23 |
| Antioxidant (Note 2) | 0.5 | 0.5 | 0.5 |
| Dicumyl peroxide | 1.0 | 1.0 | 2.4 |
| 2-Mercaptothiazoline | 0.15 | 0.15 | 0.3 |
| Vulcanization conditions | 140° C. × 20 min. and 165° C. × 8 min. | | |

TABLE 4

| Comparative | Core formulation (Parts by weight) | | | | | | | |
|---|---|---|---|---|---|---|---|---|
| Example No. | 1 | 2 | 3 | 4 | 5 | 6 | 7 | 8 |
| BR11 (Note 1) | 100 | 100 | 100 | 100 | 100 | 100 | 100 | 100 |
| Zinc acrylate | 34 | 25 | 34 | 42 | 34 | 26 | 24 | 34 |
| Zinc oxide | 16 | 23 | 16 | 10 | 16 | 22 | 23 | 16 |
| Antioxidant (Note 2) | 0.5 | 0.5 | 0.5 | 0.5 | 0.5 | 0.5 | 0.5 | 0.5 |
| Dicumyl peroxide | 1.0 | 2.4 | 2.0 | 1.0 | 1.1 | 2.1 | 2.2 | 1.0 |
| Diphenyl disulfide | — | — | 0.5 | — | — | — | — | — |
| Pentachlorothiophenol | — | — | — | — | — | — | 0.5 | — |
| Vulcanization conditions (° C. × min.) | 140 × 20 + 165 × 8 | 160 × 35 | 140 × 20 + 165 × 8 | 150 × 20 | 150 × 20 | 150 × 20 | 150 × 20 | 140 × 20 + 165 × 8 |

(Note 1): Hi-cis polybutadiene manufactured by Japan Synthetic Rubber Co., Ltd. (content of 1,4-cis-polybutadiene: 96%)
(Note 2): Yoshinox 425 (manufactured by Yoshitomi Pharmaceutical Co., Ltd.)

Formation of Golf Ball

A pellet-like cover composition was prepared by mixing cover formulation components shown in the following Table 5 by using a twin-screw kneading type extruder. The extrusion conditions were screw diameter: 45 mm, screw revolution: 200 rpm, screw UD: 35. The formulation components were heated to 220 to 260° C. at a die position of the extruder. The cover composition was injection-molded on the core to form a cover layer, followed by painting on the surface to obtain a two-piece solid golf ball having an outer diameter of 42.7 mm. The ball compression, ball initial velocity, flight distance (carry) and durability of the resulting golf ball were evaluated. Methods for evaluation are explained after Table 5. The results of the evaluation are shown in Tables 6 to 8.

TABLE 5

| Cover formulation (parts by weight) | A | B | C | D | E | F |
|---|---|---|---|---|---|---|
| Hi-milan # 1605 (Note 3) | — | 50 | 50 | 50 | — | — |
| Hi-milan # 1706 (Note 4) | 5 | 50 | 50 | — | — | — |
| Hi-milan # 1855 (Note 5) | 85 | — | — | — | 50 | — |
| Hi-milan # 1555 (Note 6) | 10 | — | — | — | — | — |
| Hi-milan # 1557 (Note 7) | — | — | — | — | 20 | — |
| Hi-milan # 1707 (Note 8) | — | — | — | 50 | 30 | — |
| Surlyn AD 8511 (Note 9) | — | — | — | — | — | 25 |
| Surlyn AD 8512 (Note 10) | — | — | — | — | — | 25 |
| ESBS AT015 (Note 11) | — | — | — | — | — | 15 |
| HG-252 (Note 12) | — | — | — | — | — | 35 |
| Titanium oxide | 2 | 2 | 2 | — | 2 | 2 |
| Barium sulfate | 2 | 2 | — | — | — | — |

(Note 3): Ethylene-methacrylic acid copolymer ionomer resin prepared by neutralizing with sodium ion, manufactured by Mitsui Du Pont Polychemical Co., Ltd.
(Note 4): Ethylene-methacrylic acid copolymer ionomer resin prepared by neutralizing with zinc ion, manufactured by Mitsui Du Pont Polychemical Co., Ltd.
(Note 5): Ethylene-methacrylic acid-acrylate terpolymer ionomer resin prepared by neutralizing with zinc ion, manufactured by Mitsui Du Pont Polychemical Co., Ltd.
(Note 6): Ethylene-methacrylic acid copolymer ionomer resin prepared by neutralizing with sodium ion, manufactured by Mitsui Du Pont Polychemical Co., Ltd.
(Note 7): Ethylene-methacrylic acid copolymer ionomer resin prepared by neutralizing with zinc ion, manufactured by Mitsui Du Pont Polychemical Co., Ltd.
(Note 8): Ethylene-methacrylic acid copolymer ionomer resin prepared by neutralizing with sodium ion, manufactured by Mitsui Du Pont Polychemical Co., Ltd.
(Note 9): Ethylene-methacrylic acid copolymer ionomer resin neutralized with zinc ion having a flexural modulus of 2,500 kgf/cm$^2$ and a Shore D hardness of 60, available from Du Pont Co.
(Note 10): Ethylene-methacrylic acid copolymer ionomer resin neutralized with sodium ion having a flexural modulus of 3,100 kgf/cm$^2$ and a Shore D hardness of 62, available from Du Pont Co.
(Note 11): Styrene-butadiene-Styrene block copolymer having a polybutadiene block with epoxy groups having a ratio of styrene/butadiene of 40/60 (weight ratio), a JIS A hardness of 67 and an epoxy content of about 1.5 to 1.7% by weight, available from Daicel Chemical Ind., Co.

TABLE 5-continued

| Cover formulation (parts by weight) | A | B | C | D | E | F |
| --- | --- | --- | --- | --- | --- | --- |

(Note 12): Hydrogenated styrene-isoprene-styrene block copolymer having OH group at terminals (JIS A hardness of 80 and Styrene content of 40% by weight), available from Kuraray Co.

Evaluation Methods

Core Compression

On the basis of the deformation formed by applying an initial load of 10 kgf to a core, the compression deformation formed by applying a final load of 130 kgf was measured and a difference between 10 Kgf load and 130 Kgf load is expressed as core compression.

Core Rebound Coefficient

A metal cylindrical article (198.4 g) was hit against a core at a speed of 40 m/s and the velocities of the cylindrical article and the golf ball before and after hitting were measured. The core rebound coefficient was calculated form each speed and weight.

Ball Compression

On the basis of the deformation formed by applying an initial load of 10 kgf to a golf ball, the compression deformation formed by applying a final load of 130 kgf was measured and a difference between 10 Kgf load and 130 Kgf load is expressed as ball compression.

Ball Initial Velocity

It was measured by the R & A initial velocity measuring method.

Shot Feel at the Time of Hitting

A golf ball was practically hit by 10 golfers including professional golfers and top amateur golfers, and the shot feel at the time of hitting was evaluated by the number of the golfers who judged the shot feel "good" according to the following criteria.

| Criteria of judgment: |
| --- |
| ⊚: 10 golfers |
| ○: 7–9 golfers |
| Δ: 4–6 golfers |
| X: 0–3 golfers |

Ball Rebound Coefficient

A metal cylindrical article (198.4 g) was hit against a golf ball at a speed of 45 m/second by using a R & A initial velocity measuring machine and the velocities of the cylindrical article and the golf ball before and after hitting were measured. The ball rebound coefficient was calculated form each velocity and weight.

Flight Distance (Carry)

A No. 1 wood club (driver) was attached to a swing robot manufactured by True Temper Co. and a golf ball was hit at a head speed of 45 m/second. Then, a carry (distance to the first dropping point on the ground) was measured.

Durability

A No. 1 wood club (driver) was attached to a swing robot manufactured by True Temper Co. and a golf ball was hit at a head speed of 45 m/second and the number of hitting until breakage arose was determined. In Tables, the results are represented by an index in case that the impact resistance number (number of hitting until breakage arises) of the golf ball of Comparative Example 2 is 100. In Tables 6 to 8, the results are represented by an index in case that the impact resistance number (number of hitting until breakage arises) of the golf ball of Comparative Example 6 is 100.

(Test results)

TABLE 6

| Test item | Example No. 1 | Example No. 2 | Comparative Example No. 1 | Comparative Example No. 2 | Comparative Example No. 3 |
| --- | --- | --- | --- | --- | --- |
| Core weight (g) | 34.7 | 34.7 | 34.7 | 34.7 | 34.7 |
| Core compression (mm) | 2.65 | 3.80 | 2.66 | 3.79 | 2.75 |
| Core rebound coefficient | 0.789 | 0.777 | 0.783 | 0.770 | 0.785 |
| Cover formulation | A | B | A | B | A |
| Ball weight (g) | 45.4 | 45.4 | 45.4 | 45.4 | 45.4 |
| Ball compression (mm) | 2.65 | 2.83 | 2.62 | 2.83 | 2.74 |
| Ball initial velocity (ft/second) | 253.5 | 252.8 | 252.9 | 252.1 | 253.0 |
| Flight distance (yard) | 230 | 229 | 224 | 222 | 227 |
| Durability (index) | 160 | 120 | 140 | 100 | 180 |

TABLE 7

| Test item | Example No. 3 | Example No. 4 | Example No. 5 | Example No. 6 | Example No. 7 | Example No. 8 |
| --- | --- | --- | --- | --- | --- | --- |
| Core compression (mm) | 2.80 | 3.21 | 3.72 | 3.45 | 2.74 | 3.15 |
| Core rebound coefficient | 0.792 | 0.784 | 0.778 | 0.783 | 0.792 | 0.785 |
| Cover formulation | D | D | E | E | C | C |
| Ball compression (mm) | 2.50 | 2.87 | 3.31 | 3.12 | 2.43 | 2.80 |
| Shot feel at the time of hitting | ○ | ○ | ⊚ | ⊚ | ○ | ○ |
| Ball rebound coefficient | 150 | 120 | 110 | 115 | 150 | 120 |
| Flight distance (yard) | 242 | 231 | 221 | 229 | 240 | 231 |
| Durability (index) | 150 | 130 | 120 | 125 | 150 | 130 |

TABLE 8

| Test item | Example No. 9 | Example No. 10 | Example No. 11 | Example No. 12 | Example No. 13 | Example No. 14 |
| --- | --- | --- | --- | --- | --- | --- |
| Core compression (mm) | 3.67 | 3.35 | 2.76 | 3.18 | 3.69 | 3.39 |
| Core rebound coefficient | 0.779 | 0.784 | 0.791 | 0.783 | 0.777 | 0.782 |
| Cover formulation | C | C | C | C | C | C |
| Ball compression (mm) | 3.21 | 3.01 | 2.46 | 2.83 | 3.24 | 3.03 |
| Shot feel at the time of hitting | ⊚ | ⊚ | ○ | ○ | ⊚ | ⊚ |
| Ball rebound coefficient | 110 | 115 | 150 | 120 | 110 | 115 |
| Flight distance (yard) | 220 | 229 | 238 | 227 | 218 | 226 |
| Durability (index) | 120 | 125 | 150 | 130 | 120 | 125 |

TABLE 9

| Test item | Example No. 15 | Example No. 16 | Example No. 17 |
| --- | --- | --- | --- |
| Core compression (mm) | 2.65 | 2.65 | 3.79 |
| Core rebound coefficient | 0.789 | 0.789 | 0.779 |
| Cover formulation | A | F | B |
| Ball compression (mm) | 2.62 | 2.62 | 2.83 |
| Shot feel at the time of hitting | ⊚ | ⊚ | ○ |
| Ball rebound coefficient | 135 | 140 | 130 |
| Flight distance (yard) | 230 | 231 | 229 |
| Durability (index) | 160 | 150 | 130 |

TABLE 10

| Test item | Comparative Example No. | | | | |
|---|---|---|---|---|---|
| | 4 | 5 | 6 | 7 | 8 |
| Core compression (mm) | 2.74 | 2.70 | 3.62 | 3.51 | 2.65 |
| Core rebound coefficient | 0.789 | 0.780 | 0.770 | 0.771 | 0.779 |
| Cover formulation | C | C | C | C | F |
| Ball compression (mm) | 2.15 | 2.40 | 3.18 | 3.12 | 2.62 |
| Shot feel at the time of hitting | X | Δ | ○ | ○ | ⊚ |
| Ball rebound coefficient | 140 | 130 | 100 | 105 | 110 |
| Flight distance (yard) | 235 | 233 | 215 | 217 | 224 |
| Durability (index) | 150 | 140 | 100 | 105 | 120 |

As is apparent from the results of Table 6, the golf balls using 4-methylphenol sulfide of Examples 1 and 2 of the present invention were superior in ball initial velocity, flight distance and durability to the golf balls using no 4-methylphenol sulfide of Comparative Examples 1 and 2. The golf balls of Examples 1 and 2 of the present invention showed large compression and were superior in ball initial velocity, flight distance and durability to the golf ball using diphenyl disulfide having no substituent of Comparative Example 3.

As is apparent from the results of Tables 7, 8 and 10, the golf balls using bis(4-methacryloylthiophenyl)sulfide of Examples 3 and 5 of the present invention were superior in shot feel at the time of hitting, rebound coefficient, flight distance and durability to the golf balls of the corresponding Comparative Examples 5 and 6 in which no sulfide was formulated.

The golf balls of Examples 3 to 6 of the present invention were the same as or superior in shot feel at the time of hitting to the golf ball using pentachloro-thiophenol described in Japanese Patent Kokai Publication No. 109970/1992 of Comparative Example 7, and were superior in rebound coefficient, flight distance and durability to the golf ball of Comparative Example 7.

The golf balls of Examples 7 and 9 using 4,4'-thiodibenzenthiol as the organosulfur compound in the present invention and the golf balls having the same composition except for changing the organosulfur compound to 4,4'-dibromodiphenyl sulfide of Examples 11 and 13 were superior in rebound coefficient, flight distance and durability to the golf balls of the corresponding Comparative Examples 5 and 6 in which no organosulfur compound was employed, irrespective of the hardness of compression of core and ball.

The golf balls of Examples 8 and 12 in which 4,4'-thiodibenzenethiol or 4,4'-dibromodiphenyl sulfide was used as the organosulfur compound in the present invention were superior in rebound coefficient, flight distance and durability to the golf ball of Comparative Example 7 in which pentachloro-thiophenol was used as an organosulfur compound different from the organosulfur compound in the present invention.

The golf ball of Comparative Example 4 in which no organosulfur compound was formulated and a large amount of zinc acrylate was formulated was superior in rebound coefficient, flight distance and durability, but was poor in shot feel at the time of hitting.

The golf balls of Examples 10 and 4 which contained larger amount of 4,4'-thiodibenzene thiol or 4,4'-dibromodiphenylsulfide show the same characteristics in rebound coefficient, flight distance and durability as those of Examples 8 and 12.

The golf balls of Examples 15 and 16 contained 2-mercaptothiazoline in an amount of 0.15 parts by weight based on 100 parts by weight of butadiene ruber and the golf ball of Example 17 contained it in an amount of 0.5 parts by weight. The golf balls of Examples 15 and 16 had excellent durability and flight distance and the golf ball of Example 17 had similar durability to that of Comparative Example 1, but had good flight distance.

As is apparent from the above results, the golf balls using the organosulfur compound in the present invention of the Examples were superior in flight distance, durability, rebound coefficient and shot feel at the time of hitting to the golf balls without using an organosulfur compound of the present invention or the golf balls using an organosulfur compound other than the organosulfur compound in the present invention of the Comparative Examples.

What is claimed is:

1. A solid golf ball comprising a core and a cover formed on the core, wherein the core is formed from a rubber composition comprising:
   (i) a base rubber,
   (ii) a metal salt of α,β-unsaturated carboxylic acid,
   (iii) a co-crosslinking initiator, and
   (iv) an organosulfur compound selected from the group consisting of:
   (a) 4-methylphenol sulfide represented by

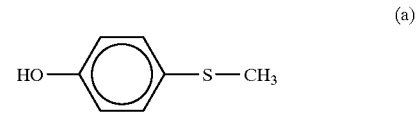

(a)

(b) bis(4-methacryloylthiophenyl)sulfide represented by

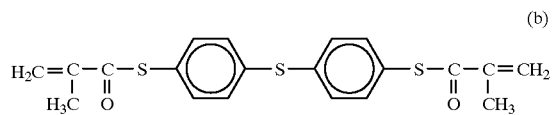

(b)

(c) 4,4'-dithiodibenzene thiol represented by

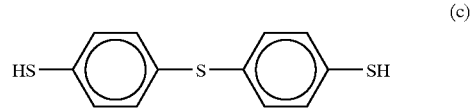

(c)

(d) 4,4'-dibromodiphenylsulfide represented by

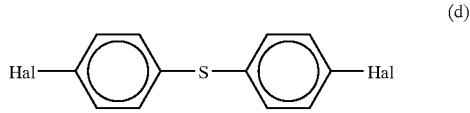

(d)

(wherein Hal represents a halogen atom)
   (e) 2-mercaptothiazoline represented by

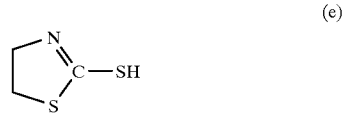

(e)

(f) a mixture thereof.

2. The solid golf ball according to claim 1 wherein the organosulfur compound is contained in an amount of 0.05 to 5.0 parts by weight based on 100 parts by weight of the base rubber.

3. A solid golf ball comprising a core and a cover formed on the core, either or both of the core and cover being multi-layered, wherein at least one layer of the core is formed from a rubber composition comprising:

(i) a base rubber, (ii) a metal salt of α,β-unsaturated carboxylic acid, (iii) a co-crosslinking initiator, and (iv) an organosulfur compound selected from the group consisting of:

(a) 4-methylphenol sulfide represented by

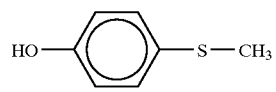

(b) bis(4-methacryloylthiophenyl)sulfide represented by

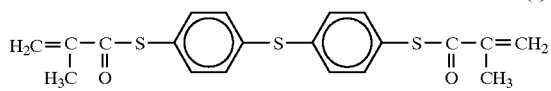

(c) 4,4'-dithiodibenzene thiol represented by

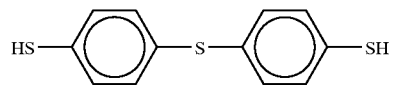

(d) 4,4'-dibromodiphenylsulfide represented by

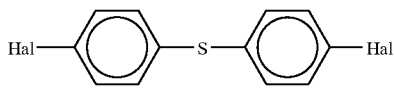

(wherein Hal represents a halogen atom)

(e) 2-mercaptothiazoline represented by

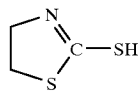

(f) a mixture thereof.

4. The solid golf ball according to claim 3 wherein the organosulfur compound is contained in an amount of 0.05 to 5.0 parts by weight based on 100 parts by weight of the base rubber.